United States Patent Office 3,256,916
Patented June 21, 1966

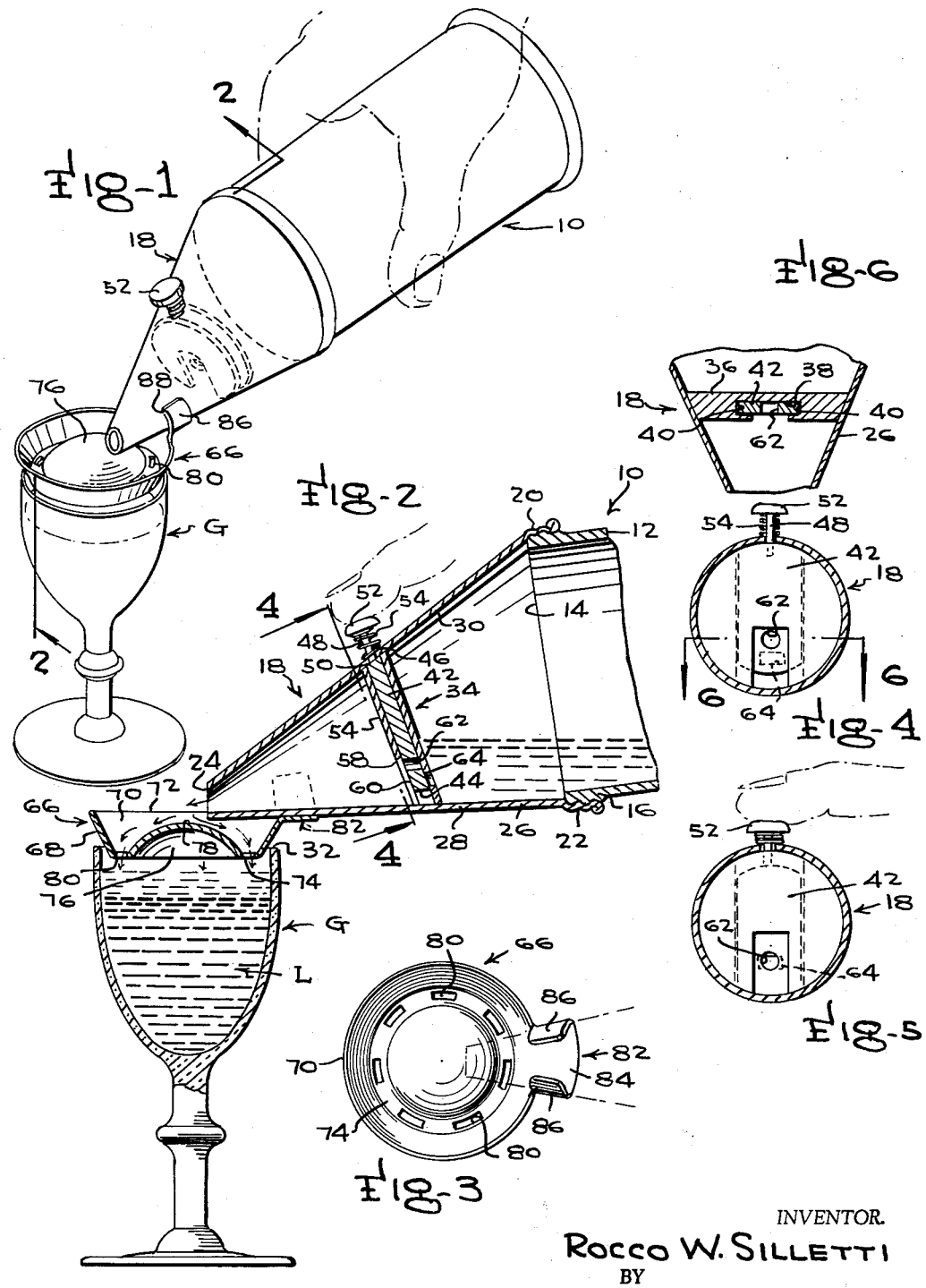

3,256,916
LIQUID FLOATING DEVICE
Rocco W. Silletti, 1821 E. Thurston, Spokane, Wash.
Filed Oct. 18, 1963, Ser. No. 317,208
2 Claims. (Cl. 141—286)

This invention relates to a novel liquid floating device for use, especially but not exclusively, in the preparation of individual layered beverages.

In the preparation of layered beverages involving layers of different liquid ingredients, whose admixture is to be avoided, much time, effort, and risk of failure is present, using present methods. These methods usually comprise inverting a bar spoon over the beverage glass and holding the spoon in place with one hand, while pouring liquid from a container, with the other hand, gently and as evenly as possible over the center of the bowl of the spoon, so as to cause this liquid to float upon a subjacent layer of liquid in the glass, without admixture therewith. These and similar methods obviously, especially where a batch of several drinks is to be prepared, introduce factors of error, resulting in failure, partial or complete, and cannot be speeded up to the point of efficiency and economy required or desirable in commercial establishments, such as bars and restaurants.

The primary object of the invention is the provision of a simple, easily used, and efficient device, adapted to be held and operated in one hand, which eliminates the above-outlined objectionable features of manual methods, greatly speeds up the preparation of layered beverages, and, at the same time, does away with wastage of ingredients and unsightly smearing of glasses.

Other important objects and advantageous features of the invention will be apparent from the following description and the accompanying drawings, wherein, for purposes of illustration only, a specific form of the invention is set forth in detail.

In the drawings:

FIGURE 1 is a schematic perspective view showing a device of the present invention positioned operatively relative to a beverage glass for floating a layer of liquid onto the top of liquid present in the glass;

FIGURE 2 is an enlarged fragmentary vertical longitudinal section taken on the line 2—2 of FIGURE 1, showing the dispensing valve in elevated closed position;

FIGURE 3 is a top plan view of the floating pan;

FIGURE 4 is a transverse vertical section taken on the line 4—4 of FIGURE 2;

FIGURE 5 is a view like FIGURE 4, showing the dispensing valve depressed to open position;

FIGURE 6 is a fragmentary horizontal section taken on the line 6—6 of FIGURE 4.

Referring in detail to the drawings, the illustrated device comprises a horizontally elongated, preferably cylindrical container 10 having a sidewall 12, a closed rear end, and an open forward end 14, around which is an external screw threaded bead 16.

A funnel-shaped spout 18 has an open larger rear end 20, which merges into an internally screw threaded flange 22, which is adapted to be threaded onto the bead 16. The spout 18 has a relatively small diameter open forward end 24. The spout has a sidewall 26 which, when the spout is properly positioned on the container 10, has a horizontal bottom portion 28, which has only a slight forward inclination, relative to the container, and a top portion 30 which declines at a relatively great angle, relative to the container, to the forward end 24 of the spout. This arrangement facilitates accurate visual inspection of the portion of the spout 18, relative to the open top 32 of a beverage glass, such as the stemmed cordial glass G, illustrated.

A dispensing valve 34 extends across the interior of the spout 18, preferably midway between its ends, which serves when the device is not in use, to confine the contents of the container 10, and preclude access of air thereto, and evaporation thereof; and to controllably and gently feed liquid from the container into the spout 18, forwardly of the valve, when the device is in use.

The valve 34 comprises, as shown in detail in FIGURES 2 and 6, a forwardly inclined imperforate partition wall 36 extending across and fixed to the spout sidewall 26. The forward side of the wall 36 is formed centrally with a vertical slot 38 whose side edges are formed with parallel spaced vertical facing grooves 40, in which the side edges of a vertically slidable rectangular valve plate 42 are confined. As shown in FIGURE 2, the valve plate 42 is somewhat shorter in height than the slot 38 to allow for vertical movements of the valve plate, and has a beveled lower end 44, for flush stopping contact with the bottom portion 28 of the spout sidewall in the depressed open position of the valve plate. The valve plate 42 has a beveled upper end 46 for flush stopping contact with the top portion 30 of the sidewall of the spout, in the elevated closed position of the valve plate, as shown in FIGURE 2.

A relatively small diameter centered stem 48 projects from the upper end of the valve plate 42, slides through an accommodating hole 50, in the top portion 30 of the spout sidewall, and is provided on its upper end with a finger knob 52. A coil valve plate retracting spring 54 is circumposed on the stem 48 and is compressed between the knob 52 and the spout sidewall.

As shown in FIGURES 2, 4 and 5, the upper part of the slot 38 in the partition wall 36, as far as the upper portion 30 of the spout sidewall 26, is closed by a wall 56, which, at its lower end 58, is spaced upwardly from the bottom portion 28 of the spout sidewall, so as to provide a liquid transfer opening 60. The valve plate 42 has, adjacent to its lower end 44, a relatively small diameter centered dispensing opening 62, which, in the elevated position of the valve plate 42, is spaced above a similar-sized discharge opening 64, provided through the partition wall 36, which is closed by the lower part of the valve plate 42, as shown in FIGURE 2. Manual depression of the knob 52, by means of a finger of the user of the device, against the resistance of the spring 54, serves to align the openings 62 and 64, either fully or partially, at the desire of the user of the device, whereby controlled and gentle dispensing of liquid from the container 10 into the forward part of the spout 18, beyond the partition wall 36 is obtained, to be poured through the forward end 24 of the spout 18, at the rate desired.

In order to assure even and gentle dispensing of the liquid from the device, onto liquid L already present in the glass G, the spout 18 is equipped with a liquid floating pan 66. The pan 66 comprises a low profile circular receptacle 68, has an upwardly flaring peripheral side wall 70, which, at its upper edge 72, is larger in diameter than the open top 32 of the glass G, and is substantially smaller than the open top of the glass, at its lower edge, as shown in FIGURE 2, where the sidewall 70 merges into the outer edge of a flat, relatively narrow annular bottom wall portion 74. The bottom wall portion 74 merges into a relatively large diameter domed central bottom wall portion 76, whose apex 78 is spaced downwardly from the upper edge 72 of the receptacle side wall 70. The flat annular bottom wall portion 74 is formed with a plurality of equally circumferentially spaced circumferentially extending arcuate slots 80. The slots 80, as shown in FIGURE 3, are spaced at distances from each other preferably at least as great as the length of a single slot 80.

The receptacle 68 is secured to the underside of the forward end of the spout 18, by means of a bracket 82 which is a flat radial extension 84, on the upper edge 72 of the receptacle side wall 70. The extension 84 is chordally elongated and its end portions 86 are bent upwardly and inwardly around the sides of the forward part of the spout and secured thereto, as by means of weldings 88, at a location such that the open forward end 24 of the spot is located over and above the adjacent side of the domed bottom wall portion 76 of the receptacle 68.

With the foregoing arrangements, liquid dispensed from the open forward end of the spout 18, pours gently upon the domed portion, as indicated by arrows in FIGURE 2, and flows evenly down around the domed portion, onto the annular bottom wall portion 74, and evenly and gently through the slots 80, onto the top of the liquid L in the glass G. This floats the container liquid such as cream, onto the liquid L in the glass G, without touching the sides of the glass, and without admixture with the liquid L.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A liquid-floating pan comprising a receptacle having a substantially cylindrical bottom wall and a sidewall projecting laterally from a side thereof at its peripheral marginal edge, said bottom wall having a plurality of transversely-extending circumferentially-spaced perforations extending therethrough adjacent said sidewall, and said bottom wall also including an upwardly-domed central portion with said dome portion being disposed in concentric relation relative to said sidewall.

2. A device of the character described comprising a normally horizontal hollow cylindrical liquid container having a pair of opposed open and closed ends, a spout comprising a substantially hollow funnel-shaped sidewall having a pair of opposed open front and rear ends with said rear end having a diameter greater than said front end, means releasably-connecting said rear end of said spout with said open end of said container, liquid-dispensing valve means mounted across the interior of said spout intermediate said front and rear ends thereof, said valve means comprising a vertical partition wall formed with a vertical slot, said slot being closed at its rear side with a rear wall and at its forward side by a front wall, said front wall having a lower end spaced upwardly from the bottom part of said sidewall of said spout to define a liquid-transfer opening, the confronting sidewalls of said partition wall defining the opposed sides of said slot each being formed with an inwardly-extending groove with said grooves being disposed in spaced confronting and parallel relation relative to one another, a valve plate having side edges slidably-confined in said grooves, said valve plate being shorter than the distance between the top and bottom portions of the sidewall of said spout, said sidewall of said spout having an opening extending transversely therethrough confronting said valve plate, a stem mounted on the upper end of said valve plate and projecting away therefrom, said stem working through said opening provided in said sidewall, a finger knob on the supper end of said stem, a coil spring circumposed on said stem and compressed between said knob and said sidewall, said spring normally holding said valve plate in elevated closed position, said rear wall being formed with an opening registered with said transfer opening, said valve plate being formed with a dispensing opening adapted to register with said rear wall opening only in a depressed position of said valve plate, a liquid-floating pan including means for detachably-connecting said pan to said spout with said pan projecting forwardly of said open end of said spout, said pan including a bottom wall having an upstanding sidewall at the outer peripheral marginal edge thereof, said bottom wall being formed with perforations extending transversely therethrough adjacent said outer marginal edge thereof, said bottom wall also including an upwardly-domed central portion disposed in juxtaposed position relative to said open end of said funnel, and said perforations being circumferentially-spaced about said bottom wall.

References Cited by the Examiner

UNITED STATES PATENTS

| | | | |
|---|---|---|---|
| 1,865,227 | 6/1932 | Arzino | 141—286 |
| 1,886,106 | 11/1932 | Kean | 222—568 X |
| 2,666,555 | 1/1954 | Hill | 222—561 X |
| 2,701,078 | 2/1955 | Bowman | 141—366 X |
| 2,775,486 | 12/1956 | King | 222—565 X |

LAVERNE D. GEIGER, *Primary Examiner.*

H. BELL, *Assistant Examiner.*